(12) United States Patent
Besset-Bathias

(10) Patent No.: US 6,704,315 B1
(45) Date of Patent: Mar. 9, 2004

(54) METHOD FOR GENERATING ATM CELLS FOR LOW BIT RATE APPLICATIONS

(75) Inventor: Claire Besset-Bathias, Neuilly sur Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/409,910

(22) Filed: Oct. 1, 1999

(30) Foreign Application Priority Data

Jun. 30, 1999 (EP) ............................................. 99401630

(51) Int. Cl.[7] .......................... H04L 12/28; H04L 12/56
(52) U.S. Cl. .................................... 370/395.4; 370/473
(58) Field of Search ......................... 370/395.1, 395.43, 370/395.6, 395.4, 473, 474

(56) References Cited

U.S. PATENT DOCUMENTS

| | | | | |
|---|---|---|---|---|
| 5,802,051 A | * | 9/1998 | Petersen et al. | 370/395.42 |
| 5,809,023 A | * | 9/1998 | Petersen et al. | 370/395.1 |
| 6,331,981 B1 | * | 12/2001 | Harth et al. | 370/395.1 |
| 6,404,767 B1 | * | 6/2002 | Depelteau et al. | 370/395.1 |

OTHER PUBLICATIONS

Wang, X. et al.: "A Predictive Bandwidth Management Scheme and Network Architecture for Real–time VBR Traffic" Microprocessors and Microsystems, vol. 22, No. 10, May 3, 1999, pp. 597–604, XP004168537 ISSN: 0141–9331.

Zhou, S.H. et al.: "Bypassing Vocoders in CDMA Mobile–to Mobile Calls" '98. 48th IEEE Vehicular Technology Conference. Pathway to a Global Wireless Revolution (CAT No. 98CH36151), Ottawa, Ont., Canada, May 18–21, 1998, pp. 2527–2531, vol. 3, XP002116286, 1998, New York, NY, USA IEEE, USA ISBN: 0–7803–4320–4.

Eneroth, G. et al.: "Applying ATM/AAL2 as a switching Technology in Third–Generation Mobile Access Networks" IEEE Communications Magazine, Jun. 1999, IEEE, USA, vol., 37, No. 6, pp. 112–122, XP002116287 ISSN: 0163–6804.

Lixia Zhang: "VirtualClock: A New Traffic Control Algorithm for Packet Switching Networks" Computer Communications Review, vol. 20, No. 4, Sep. 1, 1990, pp. 19–29, XP000168038, ISSN: 0146–4833.

Phee, W.–S. et al: "Interoperability Mechanism of ABR/ABR Capability in ATM Public Networks" 1997, IEEE International Conference on Communications, Montreal, Jun. 8–12, 1997, col. 2, Jun. 8, 1997, pp. 745–749, XP000742040, Institute of Electrical and Electronics Engineers ISBN: 0–7803–3926–6.

"B–ISDN ATM Adaptation Layer Specification: Type 2 AAL" ITU–T Telecommunication Standardization Sector of ITU, Sep. 1, 1997, pp. A/B, I–III, 1–, XP000770102.

\* cited by examiner

*Primary Examiner*—Ajit Patel
*Assistant Examiner*—Chirag Shah
(74) *Attorney, Agent, or Firm*—Sughrue Mion, PLLC

(57) ABSTRACT

A method for generating ATM cells for low bit rate applications, said method including:
 a segmentation and packetization step, for converting a plurality of incoming data unit streams into a plurality of incoming short packet streams, said step including a segmentation of long data units prior to the packetization of data units into short packets,
 a multiplexing and scheduling step, for multiplexing said plurality of incoming short packet streams into a single outgoing short packet stream to be packed into a same ATM connection, and for scheduling the different incoming short packet streams into said single outgoing short packet stream, in a way that short packets corresponding to long data units of different incoming data unit streams can be interleaved in said single outgoing short packet stream.

15 Claims, 2 Drawing Sheets

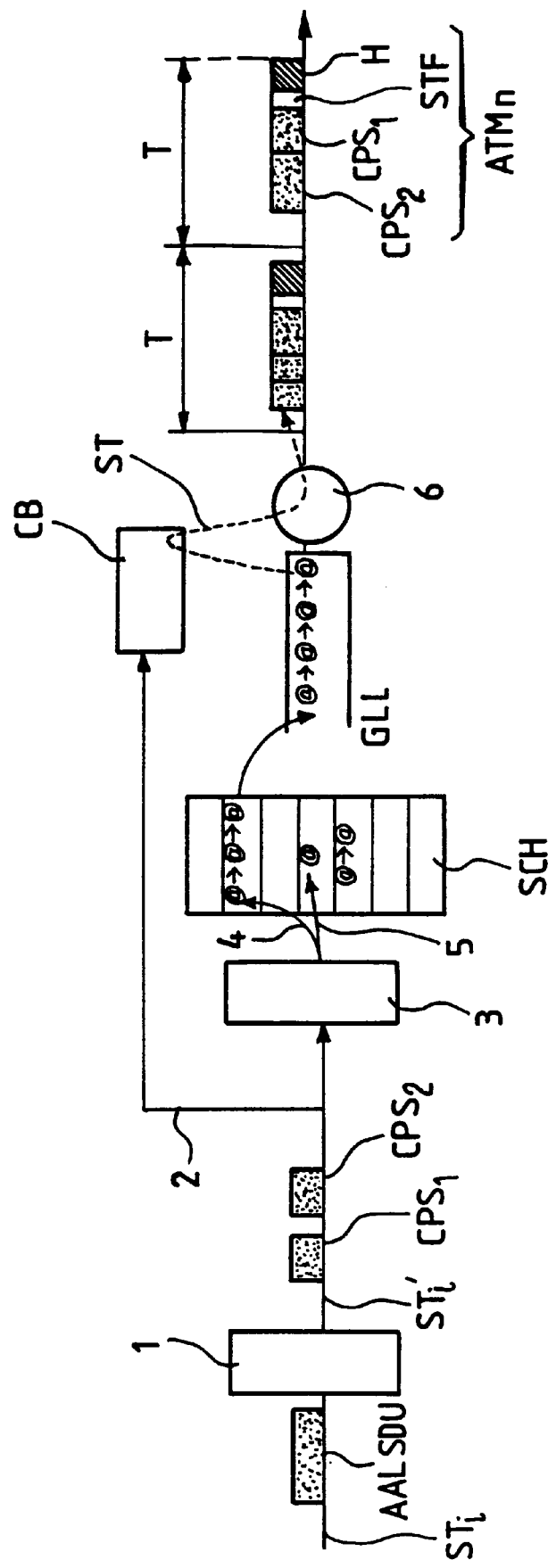

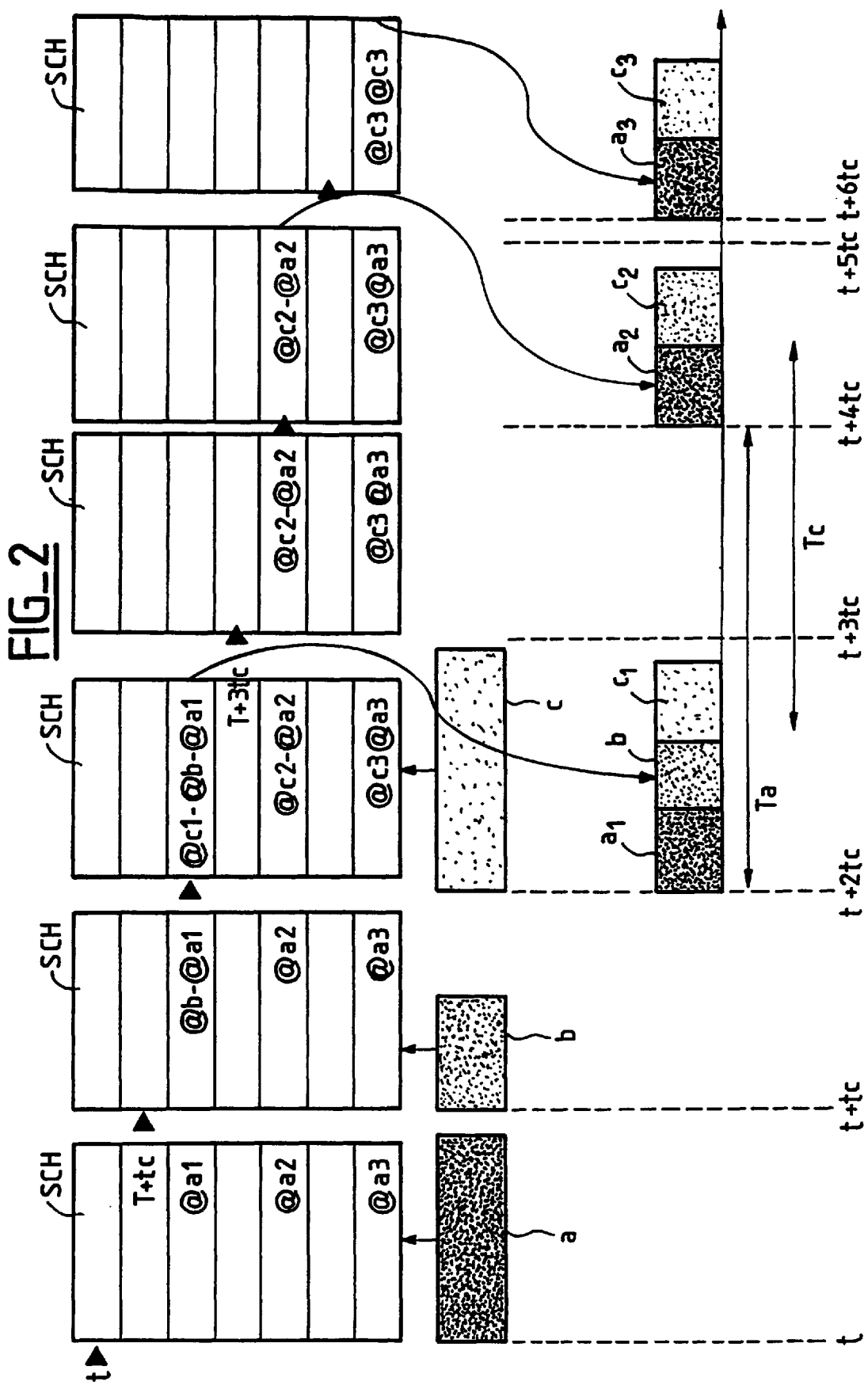

METHOD FOR GENERATING ATM CELLS FOR LOW BIT RATE APPLICATIONS

BACKGROUND OF THE INVENTION

The present invention is generally concerned with telecommunication systems.

The present invention is more particularly concerned with telecommunication systems using ATM (Asynchronous Transfer Mode). ATM is a commonly used standard for transmission of high bit rate data in telecommunication systems, which is based on an asynchronous time multiplexing of packets of fixed length called cells.

Telecommunication systems using ATM may be modelized by an ATM layer and an interface layer, or ATM Adaptation Layer (AAL), between the ATM layer and users.

A specific ATM Adaptation Layer has been provided for low bit rate applications such as in particular mobile communication systems, especially third generation mobile communication systems (such as in particular UMTS: "Universal Mobile telecommunication System").

Such a specific layer, or AAL2, is defined in ITU-T Recommendation 1.363.2. AAL2 is subdivided into a Service Specific Convergence Sublayer (SSCS) and a Common Part Sublayer (CPS) which allows several low bit rate connections to share a same ATM connection, by multiplexing several short packets called CPS packets into a same ATM cell.

AAL2 layer thus receives different incoming streams of low bit rate data units which, besides, may have different rates and/or lengths, in particular depending on the associated type of traffic (voice, data, images, signalling . . . etc.). Each incoming data unit stream is converted into an incoming short packet stream, by packetizing data units into short packets (or CPS packets). These different incoming short packet streams are multiplexed into a single outgoing short packet stream to be packed into a same ATM connection.

To be efficient, the process carried out at CPS level should simultaneously achieve a number of objectives, in particular:
  this process should be bandwidth efficient, i.e. ATM cells should be sent with as least padding as possible,
  this process should meet quality of service requirements, in particular it should introduce as least delay variations as possible,
  this process should meet different quality of service requirements for the different types of traffic to be multiplexed; in particular voice traffic is time sensitive and requires stringent delay variations objectives, while data or signalling traffic are usually tolerant to transfer delay variations.

A special cause of delay variations is the processing of long data units (i.e. in practice of data units of length higher than 45 octets).

Long data units are currently segmented prior to packetization into short packets. In this context, WO 97/48251 considers the case of two types of traffics of different priorities (i.e. voice and data traffic) and teaches to interrupt segmentation and packetisation of a long data unit (i.e. data traffic) upon the arrival of a short and more prioritary user data unit (i.e. voice traffic), in order to reduce the cell delay variations that might result of the processing of such long data units on such high priority traffic.

However this reference does not provide any solution in the general case of any number of incoming streams, and of any types of traffic carried by the different incoming streams; in particular it does not provide any solution to the problem of delay variations that might result, in the case of a plurality of incoming streams carrying long data units, of the processing of long data units of a given stream, on each of the other incoming streams.

The present invention in particular enables to avoid such drawbacks.

SUMMARY OF THE INVENTION

An object of the present invention is therefore a method for generating ATM cells for low bit rate applications, said method including:
  a segmentation and packetization step, for converting a plurality of incoming data unit streams into a plurality of incoming short packet streams, said step including a segmentation of long data units prior to the packetisation of data units into short packets,
  a multiplexing and scheduling step, for multiplexing said plurality of incoming short packet streams into a single outgoing short packet stream to be packed into a same ATM connection, and for scheduling the different incoming short packet streams into said single outgoing short pocket stream, in a way that short packets corresponding to long data units of different incoming data unit streams con be interleaved in said single outgoing short pocket stream.

According to another object of this invention, said step of multiplexing and scheduling is further carried out in a way that short packets corresponding to long data units of different lengths and/or rates can be interleaved in said outgoing short packet stream as a function of their respective lengths and/or rates.

According to another object of this invention, scheduling of a given incoming short pocket stream is determined so that short pockets of this stream are spaced of $T_i$ in said single outgoing short packet stream, where $T_i$ is the ratio between the transmission time interval, or data unit repetition period of the corresponding incoming data unit stream, and the number of short packets after segmentation of a data unit of this incoming data unit stream.

According to another object of this invention, said step of multiplexing and scheduling is further carried out in a way that short packets corresponding to short data units can be inserted in said outgoing short packet stream, as a function of their respective length and/or rate.

According to another object of this invention, said method further includes a step of scheduling ATM cell transmission times in a way as to keep ATM cell spacing as constant as possible, and a step of packing said single outgoing short packet stream into a some ATM connection having the thus scheduled ATM cell transmission times.

According to another object of this invention, said ATM cell spacing is kept as close as possible to a cell rote negociated for the corresponding ATM connection.

Depending on the type of traffic agreement for the ATM connection, and according to various embodiments, said cell rate may be:
  a PCR (Peak Cell Rate) in the case of service category of DBR (Deterministic Bit Rate) or CBR (Constant Bit Rate) type,
  a BCR (Block Cell Rate) in the case of service category of ABT (ATM Block Transfer) type,
  a ACR (Allowed Cell Rate) in the case of service category of ABR (Available Bit Rate) type.

According to another embodiment, said cell rate may be re-negociated, to optimise resource utilisation in the network.

According to another embodiment, no ATM cell is sent when there is no data available from said single outgoing short packet stream, and said method includes a further step of referencing said scheduling step with respect to the next availability of data from said single outgoing short packet stream.

Another object of the present invention is a device for generating ATM cells for low bit rate applications, said device including segmentation and packetization means, for converting a plurality of incoming data unit streams into a plurality of incoming short packet streams, said means including means for segmenting long data units prior to packetizing data units into short packets, multiplexing and scheduling means, for multiplexing said plurality of incoming short packet streams into a single outgoing short packet stream to be packed into a same ATM connection, and for scheduling the different incoming short packet streams into said single outgoing short packet stream, in a way that short packets corresponding to long data units of different incoming data unit streams can be interleaved in said single outgoing short packet stream.

The present invention also has for its object an entity such as a base station (or Node B in UMTS) for a mobile radiocommunication network, comprising such a device.

The present invention also has for its object an entity such as a base station controller (or Radio Network Controller, or RNC, in UMTS) for a mobile radiocommunication network, comprising such a device.

BRIEF DESCRIPTION OF THE DRAWINGS

These and other objects of the present invention will become more apparent from the following description taken in conjunction with the accompanying drawings:

FIG. 1 is a diagram intended to illustrate an example of a method according to the present invention, FIG. 2 is a diagram intended to illustrate an example of application of a method according to the present invention.

MORE DETAILED DESCRIPTION OF THE INVENTION

The following notations will be used hereinafter:

Scheduler: contains the scheduling times of each incoming short packet stream

GLL: Global Linked List, contains all the addresses of CPS packets competing for packing into ATM cells t: current time $T_i$: spacing period between short packets of a given incoming stream n°i, in said outgoing stream $LVST_i$: current scheduling time of incoming short packet stream n°i.

As an example FIG. 1 illustrates one of a plurality of incoming data unit streams, noted STi, and one of the data units, noted AAL SDU, of this incoming data unit stream.

Conversion of each data unit stream such as STi into a short packet stream such as STi' is performed in segmentation and packetization means noted 1. Such a conversion includes a segmentation and a packetization of a data unit such as AAL SDU into a number of short packets, or CPS packets, such as the ones noted CPS1 and CPS2.

Queuing of the thus obtained CPS packets is carried out using a common buffer memory CB wherein the CPS packets of the different streams such as STi' are stored, as illustrated at 2 for stream STi'.

Determination of the scheduling times noted LVST of the thus queued CPS packets, into a single outgoing short packet stream obtained by multiplexing a plurality of incoming short packet streams like STi', is performed in computation means noted 3 in FIG. 1.

The address @ in the common buffer CB of a CPS packet having a thus determined scheduling time is written in that line of a scheduler noted SCH which corresponds to this time, as illustrated for example at 4 for packet CPS1 or at 5 for packet CPS2.

According to the invention, scheduling of the different short packet incoming streams into said single outgoing short packet stream is carried out in a way that short packets corresponding to long data units of different incoming data unit streams can be interleaved in said single outgoing short packet stream.

In this way, delay variations that might result, in the case of a plurality of incoming streams carrying long data units, of the processing of long data units of a given stream, on each of the other incoming streams, may be reduced, and the efficiency of the process can thus be improved.

Besides, such a scheduling may be carried out in a way that short packets corresponding to long data units of different lengths and/or rates can be interleaved in said outgoing short packet stream as a function of their respective lengths and/or rates.

Besides, such a scheduling may be carried out in a way that short packets corresponding to short data units can be inserted in said outgoing short packet stream, as a function of their respective length and/or rate.

Let LVSTi be the scheduled time of a current CPS packet of incoming stream STi'.

LVSTi may be determined according to the following relation:

$$LVST_i = LVST_i + T_i$$

In other words, LVSTi may be determined so that short packets of incoming stream STi' are spaced of $T_i$ in said outgoing stream; $T_i$ could be for example the ratio between the transmission time interval (or repetition period of data units) for stream STi, and the number N of CPS packets after segmentation of a data unit of stream STi. $T_i$ may vary according to time; in other words spacing may be dynamically determined, in order to allow the capability to adjust CPS spacing rate to a new rate each time necessary. When a spacing modification occurs for a given AAL2 connection, it is effective for the newly arrived CPS packets, not for the already stored packets of this AAL2 connection.

Besides, to take into account the arrival time "t" of each data unit stream STi, the following algorithm may be used instead to determine scheduled times LVSTi:

If $LVST_i + T_i \leq t$, $LVST_i = t$

If $LVST_i + T_i > t$, $LVST_i = LVST_i + T_i$

In other words, if necessary LVSTi=t may be considered as serving as a new reference for the computation of a new LVSTi according to relation $LVST_i = LVST_i + T_i$ used otherwise.

Scheduling of incoming short packet streams according to the thus determined scheduling times is performed by sequentially reading the different lines of the scheduler SCH and selecting for each line the short packet(s) whose address (es) are stored in this line. If several short packets are to be scheduled at a given time corresponding to a same line of the scheduler, their addresses form a linked list of addresses of CPS packets having that time as scheduled time. The resulting sequence of addresses of CPS packets competing for packing into ATM cells form the global linked list noted GLL.

Any packing process, such as illustrated at 6, may be used for packing said single outgoing short packet stream noted ST into a same ATM connection. For example, according to a current packing process, an ATM cell can be sent when it is full for "immediate" transmission or when a timer expires (timer being reset at each departure of an ATM cell). Such a current method however has the drawback of introducing in its turn delay variations.

A new packing process is now disclosed, which enables in particular to avoid such delay variations.

The following notations will be used for the description of this new packing process:

T: ATM emission interval (or ATM cell rate)

AST: ATM Scheduling Time (or ATM cell scheduled transmission time).

SLI: Sum of Length Indicators (or sum of the lengths of all CPS packets of global linked list GLL)

Let AST be a current ATM cell scheduled transmission time.

At each scheduled cell transmission time AST:

If SLI≧47 octets (i.e. if SLI≧number of octets of an ATM cell payload), the addresses in the common buffer of the first received 47 octets are read in global linked list GLL, the common buffer CB is "emptied" from these 47 first octets, SLI is set to SLI−47, and these octets are mapped into an ATM cell (no padding in this case).

If SLI<47 octets (with SLI=x), the addresses in the common buffer of the "x" first received octets of high priority are read in global linked list GLL, the common buffer CB is "emptied" from these "x" octets, and SLI is set to SLI=0. Then these "x" octets are mapped into the ATM cell and padding is used in this case to fill the cell.

An ATM cell such as for example the one noted $ATM_n$ is currently composed of a header field noted H, a so-called STF field, and CPS packets such as $CPS_1$, $CPS_2$ in this example.

Besides, at each scheduled ATM cell transmission time AST, if after this process, the global linked list GLL is empty, i.e. if no CPS packet is available for transmission in ATM cells, no new AST is scheduled, i.e. no new ATM cell is sent. Otherwise, if the global list is not empty, a new AST is scheduled. According to this new packing process, this new AST is determined in a way as to keep ATM cell spacing as constant as possible. Advantageously, AST may be computed using the following relation:

$$AST=AST+T$$

where T is the cell rate negociated for the corresponding ATM connection.

Ensuring compliance with the negociated cell rate constitutes a simple and efficient way of avoiding delay variations, while at the same time simplifying traffic management in the network.

Depending on the type of traffic agreement for the ATM connection, and according to various embodiments, cell rate may be:

a PCR (Peak Cell Rate) in the case of service category of DBR (Deterministic Bit Rate), or CBR (Constant Bit Rate) type a BCR (Block Cell Rate) in the case of service category of ABT (ATM Block Transfer) type a ACR (Allowed Cell Rate) in the case of service category of ABR (Available Bit Rate) type.

Besides, the following computation of a new AST may be performed in the case where a new CPS packet arrives at a time "t" where global linked list GLL is empty, i.e. in the case of a next availability of a CPS packet for transmission in ATM cells, further to a period of non availabilty:

if AST+T≦t, AST=t if AST+T>t, AST=AST+T

In other words, AST=t may be considered as serving as a new reference for the computation of a new AST according to relation AST=AST+T used otherwise.

Computation means (not shown) may be used for scheduling of AST times according to such a method.

FIG. 2 is a diagram intended to illustrate an example of application of the present invention, corresponding to a given example of incoming data streams.

FIG. 2 considers three incoming data unit streams, and shows three data units "a", "b", "c" received respectively for these different incoming data unit streams.

Besides, in this example data units "a" and "c" are assumed to be long data units (corresponding in particular to data traffic) and data unit "b" a short data unit (corresponding in particular to voice traffic). Data units "a" and "c" are therefore converted into a plurality of short packets, in this example three short packets, respectively a1, a2, a3 and c1, c2, c3. Transmission time interval (or data unit repetition period) is noted Ta for data units such as "a", and Tc for data units such as "c". Besides, in this example Ta=Tc=2 tc.

In this example:

at time t of reception of data unit "a", the addresses @a1, @a2, @a3 of short packets a1, a2, a3 are stored in that lines of scheduler SCH which correspond respectively to t+2tc, t+4tc, t+6tc, at time t+tc of reception of data unit "b", the address @b of short packet "b" is stored in that line of scheduler SCH which corresponds to t+2tc, at time t+2tc of reception of data unit "c", the addresses @c1, @c2, @c3 of short packets c1, c2, c3 are stored in that lines of scheduler SCH which correspond respectively to t+2tc, t+4tc, t+6tc.

Therefore, in this example:

The addresses of short packets a1, b, c1 are added to global linked list at time t+2tc, The addresses of short packets a2, c2 are added to global linked list at time t+4tc, The addresses of short packets a3, c3 are added to global linked list at time t+6tc, Therefore, in this example:

short packets a1, b, c1 are scheduled at time t+2tc into the outgoing short packet stream, short packets a2, c2 are scheduled at time t+4tc into the outgoing short packet stream, short packets a3, c3 are scheduled at time t+6tc into the outgoing short packet stream.

A method or device for generating ATM cells for low bit rate applications according to the present invention may in particular be used in mobile communication systems, in particular in a base station, or node B in UMTS, for multiplexing low bit rate traffic from a plurality of sources into a same ATM connection, for transmission to a base station controller, in a base station controller, or radio network controller or RNC in UMTS, for multiplexing low bit rate traffic from a plurality of sources into a same ATM connection, for transmission to a base station

What is claimed is:

1. A method for generating ATM cells for low bit rate applications, said method comprising:
   a segmentation and packetization step, for converting a plurality of incoming data unit streams into a plurality of incoming short packet streams, wherein long data units of said incoming data unit streams are segmented and packetized into short packets,
   a multiplexing and scheduling step, for multiplexing said plurality of incoming short packet streams into a single outgoing short packet stream to be packed into a same ATM connection, and for scheduling the different incoming short packet streams into said single outgoing short packet stream, wherein short packets corresponding to segmented long data units of different incoming data unit streams are interleaved in said single outgoing short packet stream regardless of a transmission priority associated with each of said long data units.

2. A method according to claim 1, wherein said step of multiplexing and scheduling is further carried out in a way that short packets corresponding to long data units of different lengths and/or rates can be interleaved in said outgoing short packet stream as a function of their respective lengths and/or rates.

3. A method according to claim 1, wherein scheduling of a given short packet incoming stream is determined so that short packets of this stream are spaced with a spacing period $T_i$ in said single outgoing short packet stream, where $T_i$ corresponds to the ratio between the transmission time interval, or data unit repetition period in the corresponding incoming data unit stream, and the number of short packets after segmentation of a data unit of this incoming data unit stream.

4. A method according to claim 1, wherein said step of multiplexing and scheduling is further carried out in a way that short packets corresponding to short data units can be inserted in said outgoing short packet stream, as a function of their respective length and/or rate.

5. A method according to claim 1, further including a step of scheduling ATM cell transmission times in a way as to keep ATM cell spacing as constant as possible, and a step of packing said single outgoing short packet stream into a same ATM connection having the thus scheduled ATM cell transmission times.

6. A method according to claim 5, wherein said ATM cell spacing is kept as close as possible to a cell rate negociated for the corresponding ATM connection.

7. A method according to claim 6, wherein said cell rate is a Peak Cell Rate PCR in the case of service category of DBR, or Deterministic Bit Rate, or CBR, or Constant Bit Rate, type.

8. A method according to claim 6, wherein said cell rate is a Block Cell Rate BCR in the case of service category of ABT, or ATM Block Transfer, type.

9. A method according to claim 6, wherein said cell rate is an Allowed Cell Rate ACR in the case of service category of ABR, or Available Bit Rate, type.

10. A method according to claim 6, wherein said cell rate may be renegociated.

11. A method according to claim 5, wherein no ATM cell is sent when there is no data available from said single outgoing short packet stream, and said method includes a further step of referencing said scheduling step with respect to the next availability of data from said single outgoing short packet stream.

12. A device for generating ATM cells for low bit rate applications, said device comprising:
    segmentation and packetization means, for converting a plurality of incoming data unit streams into a plurality of incoming short packet streams, said means including means for segmenting and packetizing long data units of said incoming data unit streams into short packets,
    multiplexing and scheduling means, for multiplexing said plurality of incoming short packet streams into a single outgoing short packet stream to be packed into a same ATM connection, and for scheduling the different incoming short packet streams into said single outgoing short packet stream, wherein short packets corresponding to segmented long data units of different incoming data unit streams are interleaved in said single outgoing short packet stream regardless of a transmission priority associated with each of said long data units.

13. A base station for a mobile radiocommunication network, comprising a device according to claim 12 for multiplexing low bit rate traffic from a plurality of sources into a same ATM connection, for transmission to a base station controller.

14. A base station controller for a mobile radiocommunication network, comprising a device according to claim 12 for multiplexing low bit rate traffic from a plurality of sources into a same ATM connection, for transmission to a base station.

15. A method for generating ATM cells for low bit rate applications, said method comprising:
    a segmentation and packetization step, for converting a plurality of incoming data unit streams into a plurality of incoming short packet streams, wherein long data units of said incoming data unit streams are segmented and packetized into short packets,
    a multiplexing and scheduling step, for multiplexing said plurality of incoming short packet streams into a single outgoing short packet stream to be packed into a same ATM connection, and for scheduling the different incoming short packet streams into said single outgoing short packet stream, wherein short packets corresponding to segmented long data units of different incoming data unit streams are interleaved in said single outgoing short packet stream so that individual short packets corresponding to a first segmented long data unit and individual short packets corresponding to a second segmented long data unit are alternately inserted into said single outgoing short packet stream, said first and second segmented long data units having the same priority for said interleaving.

* * * * *